US012689075B2

(12) United States Patent (10) Patent No.: US 12,689,075 B2

Raymond, III et al. (45) Date of Patent: Jul. 21, 2026

(54) HIGH VOLTAGE BATTERY TEMPERATURE COOLING OPTIMIZATION PERFORMANCE PAGES

(71) Applicant: FCA US LLC, Auburn Hills, MI (US)

(72) Inventors: Victor F Raymond, III, Lake Orion, MI (US); Alexander G Rivera, Rochester Hills, MI (US); Daniel Studt, Northville, MI (US); Kirk Hansen, Hazel Park, MI (US); Brian K Barnes, Holly, MI (US); Nischal Kapoor, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 56 days.

(21) Appl. No.: 18/675,771

(22) Filed: May 28, 2024

(65) Prior Publication Data

US 2025/0372755 A1 Dec. 4, 2025

(51) Int. Cl.
| | |
|---|---|
| *H01M 10/63* | (2014.01) |
| *B60H 1/00* | (2006.01) |
| *B60L 58/26* | (2019.01) |
| *H01M 10/48* | (2006.01) |
| *H01M 10/61* | (2014.01) |
| *H01M 10/613* | (2014.01) |
| *H01M 10/62* | (2014.01) |
| *H01M 10/625* | (2014.01) |
| *H01M 10/635* | (2014.01) |
| *H01M 10/6567* | (2014.01) |

(52) U.S. Cl.
CPC ...... *H01M 10/635* (2015.04); *B60H 1/00807* (2013.01); *B60L 58/26* (2019.02); *H01M 10/486* (2013.01); *H01M 10/488* (2013.01); *H01M 10/613* (2015.04); *H01M 10/625*

(2015.04); *H01M 10/6567* (2015.04); *B60L 2240/425* (2013.01); *B60L 2240/545* (2013.01); *B60L 2250/16* (2013.01)

(58) Field of Classification Search
CPC ............ H01M 10/635; H01M 10/486; H01M 10/488; H01M 10/613; H01M 10/625; H01M 10/6567; B60H 1/00807; B60L 58/26; B60L 2240/425; B60L 2240/545; B60L 2250/16
See application file for complete search history.

(56) References Cited

U.S. PATENT DOCUMENTS

| | | | |
|---|---|---|---|
| 2012/0297805 A1* | 11/2012 | Kamada ............. | B60H 1/32281 62/208 |
| 2023/0258726 A1* | 8/2023 | Kessels ................. | F01N 3/2013 324/426 |

\* cited by examiner

*Primary Examiner* — Rodney A Butler
(74) *Attorney, Agent, or Firm* — Jeremy J. Klobucar

(57) ABSTRACT

A method for communicating temperature information of a high voltage battery system of an electrified vehicle is provided. The method includes: receiving, at a controller, sensed parameters including a maximum temperature of the high voltage battery system and a coolant temperature at the high voltage battery system; determining, at the controller, cool down parameters indicative of a time required to return the high voltage battery system from an elevated temperature to a reduced temperature suitable to achieve peak performance; sending, from the controller, a signal to a human machine interface indicative of the cool down parameters; and displaying, at the HMI, the cool down parameters.

14 Claims, 5 Drawing Sheets

HIGH VOLTAGE BATTERY TEMPERATURE COOLING OPTIMIZATION PERFORMANCE PAGES

FIELD

The present application generally relates to electrified vehicles and, more particularly, to a system and method that displays temperature information related to the high voltage battery pack and an associated motor performance status related to the battery pack temperature on a human machine interface in the vehicle.

BACKGROUND

An electrified vehicle (hybrid electric, plug-in hybrid electric, range-extended electric, battery electric, etc.) includes at least one battery system and at least one electric motor. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor.

Electrified vehicles generally include a powertrain configured to generate and transfer drive torque to a driveline of the vehicle for propulsion. The electrified powertrain generally comprises the high voltage battery system, one or more electric motors, and a transmission. The high voltage battery system generally includes a battery pack assembly that includes battery cells arranged in modules. Typically, the battery pack assembly includes a cooling system wherein a cooling liquid is circulated along a cooling plate for cooling the modules and the battery pack assembly. In general, the performance of the high voltage battery system is related to temperature. For example, when portions or all of the high voltage battery system has a high temperature, performance can be negatively impacted. Such temperature information related to the high voltage battery is generally not conveyed to the driver. As such, the driver may not know if the powertrain is at a temperature state that is optimized for a given situation. Accordingly, while such electrified vehicles do work well for their intended purpose, there exists an opportunity for improvement in the relevant art.

SUMMARY

According to one example aspect of the invention, a vehicle system that communicates temperature information of a high voltage battery system of an electrified vehicle includes a human machine interface (HMI), sensors and a controller. The HMI is provided on the electrified vehicle that is configured to convey temperature information of the high voltage battery system. The sensors sense parameters of the electrified vehicle. The sensors include at least one temperature sensor disposed on at least one battery module of the high voltage battery system, the at least one temperature sensor configured to sense a maximum temperature of the at least one battery module. The sensors also include a coolant temperature sensor that senses an inlet coolant temperature at the high voltage battery system. The controller is configured to receive the sensed parameters; determine cool down parameters indicative of a time required to return the high voltage battery system from an elevated temperature to a reduced temperature suitable to achieve peak performance; and send a signal to the HMI that displays the cool down parameters.

In some implementations, the sensors further comprise an air conditioning (A/C) sensor that senses an A/C status, and wherein the cool down parameters are further based on the A/C status.

In some implementations, the sensors further comprise an ambient air temperature sensor that senses an ambient air temperature, and wherein the cool down parameters are further based on the ambient air temperature.

In additional arrangements, the cool down parameters comprise an amount of runs remaining within maximum performance in a quarter mile.

In other examples, the cool down parameters comprise an amount of total runs possible in a quarter mile.

In additional implementations, the cool down parameters comprise a time remaining to cool the high voltage battery system until optimal cooling is achieved.

In other examples, the controller is further configured to send a signal to the HMI that displays temperature information related to the electrified vehicle.

In examples, the temperature information comprises at least one of: a front motor temperature; a rear motor temperature; a high voltage battery system temperature; and a coolant temperature of the high voltage battery system.

According to another example aspect of the invention, a method for communicating temperature information of a high voltage battery system of an electrified vehicle is provided. The method includes: receiving, at a controller, sensed parameters including a maximum temperature of the high voltage battery system and a coolant temperature at the high voltage battery system; determining, at the controller, cool down parameters indicative of a time required to return the high voltage battery system from an elevated temperature to a reduced temperature suitable to achieve peak performance; sending, from the controller, a signal to a human machine interface indicative of the cool down parameters; and displaying, at the HMI, the cool down parameters.

In some implementations, the method includes receiving an air conditioning (A/C) status, and wherein the cool down parameters are further determined based on the A/C status.

In some implementations, the method includes receiving an ambient air temperature, and wherein the cool down parameters are further determined based on the ambient air temperature.

In additional arrangements, the method includes displaying an amount of runs remaining within maximum performance in a quarter mile.

In other configurations, displaying the cool down parameters includes displaying an amount of total runs possible in a quarter mile.

In arrangements, displaying the cool down parameters includes displaying a time remaining to cool the high voltage battery system until optimal cooling is achieved.

In additional arrangements, the method includes sending a signal to the HMI that displays temperature information related to the electrified vehicle.

In some implementations, the temperature information comprises at least one of: a front motor temperature; a rear motor temperature; a high voltage battery system temperature; and a coolant temperature of the high voltage battery system.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, electrified vehicles include a powertrain configured to generate and transfer drive torque to a driveline of the vehicle for propulsion. The electrified powertrain includes a high voltage battery system, one or more electric motors, and a transmission. In general, the performance of the high voltage battery system is related to temperature. For example, when portions or all of the high voltage battery system has a high temperature, performance can be negatively impacted. Such temperature information related to the high voltage battery is generally not conveyed to the driver. As such, the driver may not know if the powertrain is at a temperature state that is optimized for a given situation.

Accordingly, the instant application provides a system and method that receives various vehicle operating input parameters including an ambient air temperature, a high voltage battery maximum temperature, available power, inlet coolant temperature, and a current air conditioning status. The system and control method determines a cool down time of the high voltage battery system based on the operating input parameters and sends a signal to a human machine interface (HMI) to display expected track performance information including (i) an amount of runs remaining with maximum performance in a quarter mile; (ii) an amount of total runs possible in a quarter mile; and (iii) a time remaining to cool the high voltage battery until optimal cooling is achieved. Additional pages are available including a temperature status page that displays a front motor temperature, a rear motor temperature, a high voltage battery system temperature and a coolant temperature of the high voltage battery system of the electrified vehicle.

Figure 1:
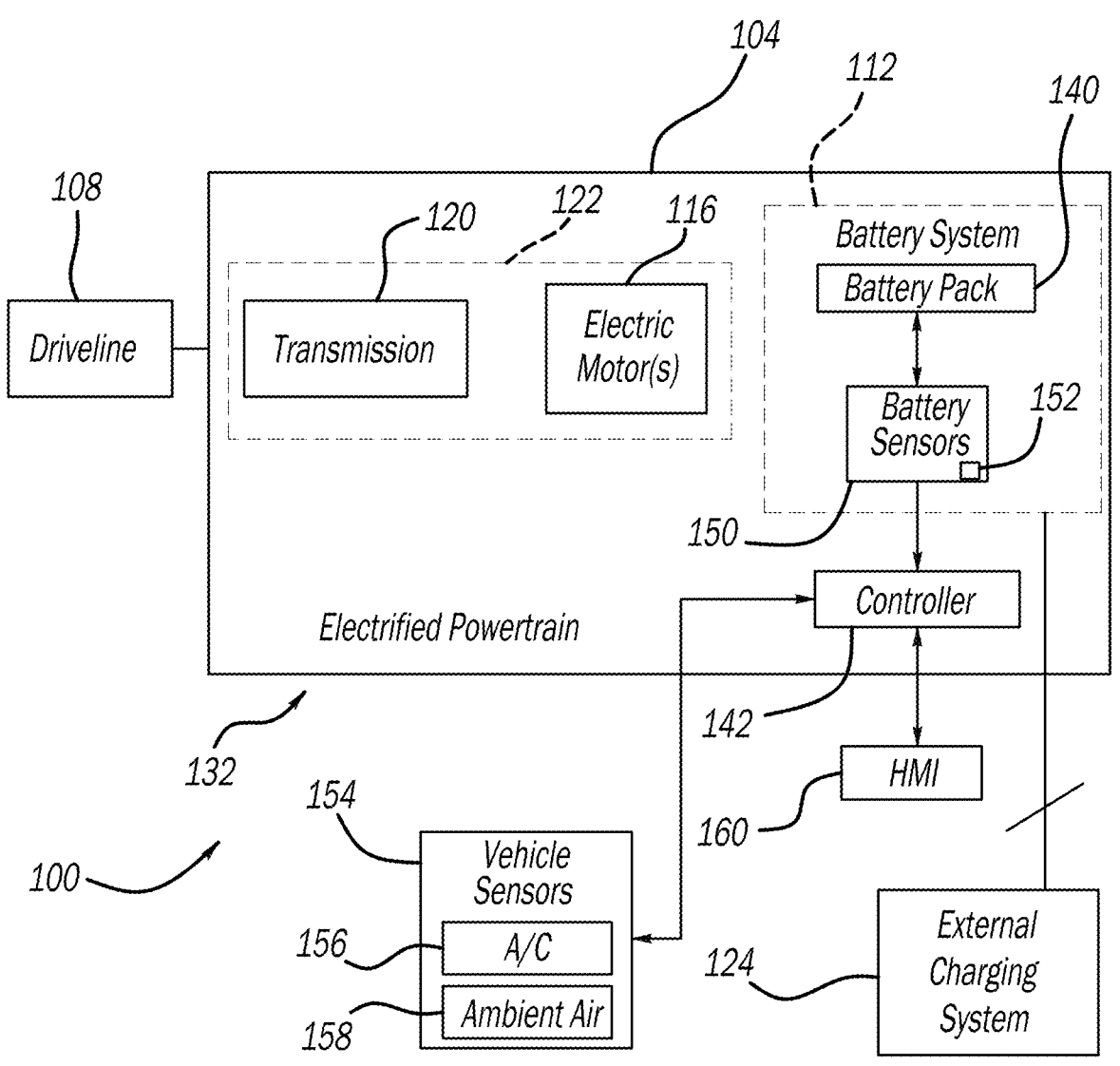
FIG. 1 is a functional block diagram of an electrified vehicle having an electric drive module and high voltage battery system according to the principles of the present application.
Figure 2:
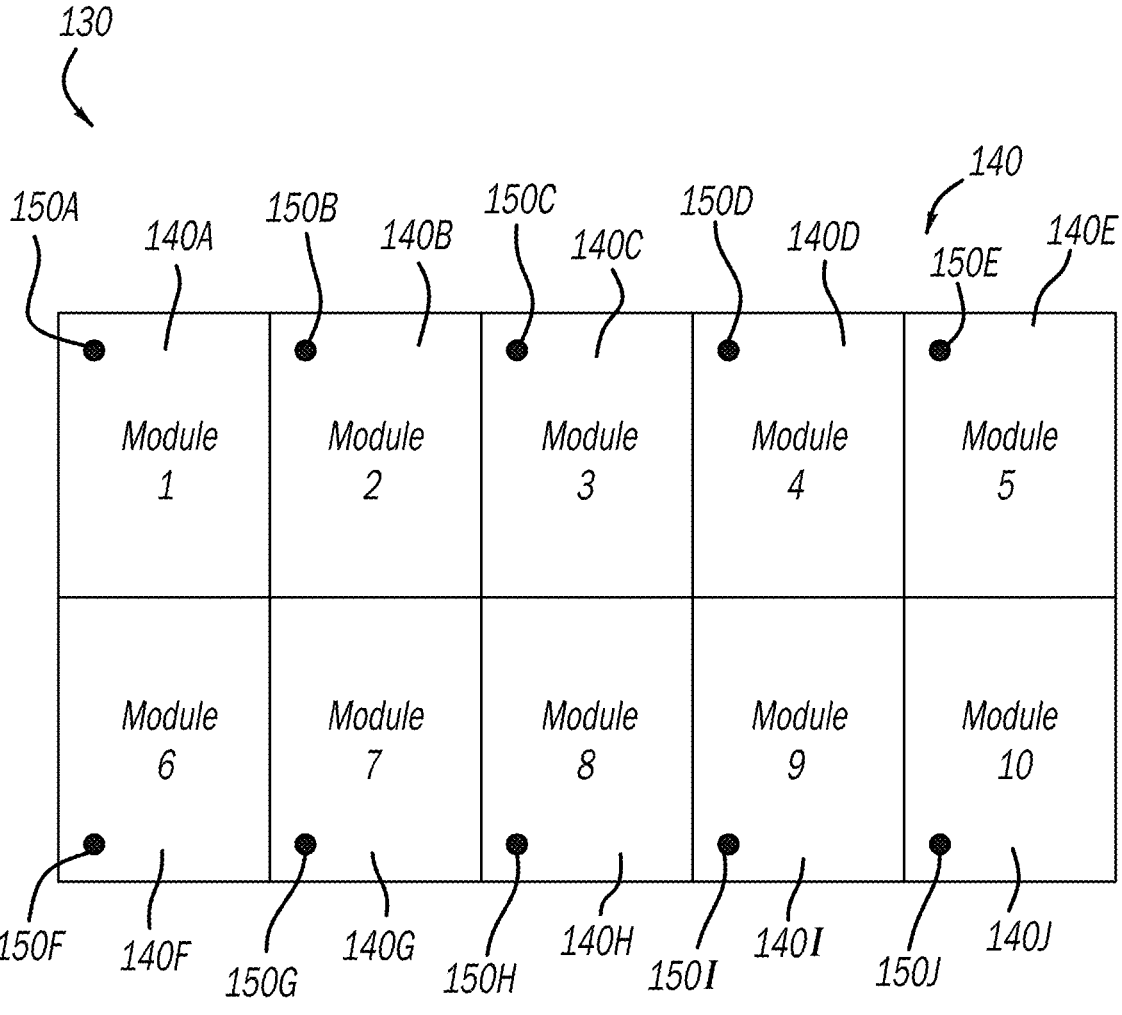
FIG. 2 is an exemplary schematic representation of a battery pack assembly of the high voltage battery system of FIG. 1 according to features of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 configured to generate and transfer drive torque to a driveline 108 of the vehicle 100 for propulsion. The electrified powertrain 104 generally comprises a high voltage battery system 112 (also referred to herein as "battery system 112"), one or more electric motors 116 (such as for example a front electric motor that delivers drive torque to at least one front drive wheel and a rear electric motor that delivers drive torque to at least one rear drive wheel), and a transmission 120. The one or more electric motors 116 and the transmission 120 can be collectively referred to herein as an electric drive module 122. The battery system 112 is selectively connectable (e.g., by the driver) to an external charging system 124 (also referred to herein as "charger 124") for charging of the battery system 112.

The present disclosure provides a vehicle system 132 that senses temperatures of the battery system 112 and communicates a signal to a human machine interface (HMI) to display the sensed temperatures to the driver. The battery system 112 includes a battery pack assembly 140 made up of individual battery modules 140A, 140B, 140C, 140D, 140E, 140F, 140G, 140H, 140I, 140J. Battery sensors, collectively identified at 150, communicate signals to the controller 142 based on operating conditions sensed at the battery pack assembly 140. In the example shown, the battery sensors 150 include multiple temperature sensors, individually identified at 150A-150J. The battery sensors 150 can also include a battery inlet coolant temperature sensor 152.

Each battery module 140A-140J includes at least one sensor 150A-150J. It will be appreciated that while the exemplary battery pack assembly 140 is shown with ten modules, that more or less modules may be incorporated within the battery pack assembly 140.

Furthermore, while one temperature sensor 150 is shown dedicated to each module 140, additional or fewer temperature sensors 150 may be incorporated throughout the battery pack assembly 140. The controller 142 is configured to communicate signals to an HMI 160 that displays temperature information related to the high voltage battery system 112. It is contemplated that the HMI 160 can include an infotainment system, cluster or other display that conveys temperature information to the driver.

Vehicle sensors 154 communicate signals to the controller 142 indicative of sensed vehicle information. In the example shown, the vehicle sensors 154 includes an air conditioning (A/C) sensor 156 that communicates an A/C status to the controller 142 and an ambient air sensor 158 that communicates an ambient air temperature to the controller 142.

Figure 3:
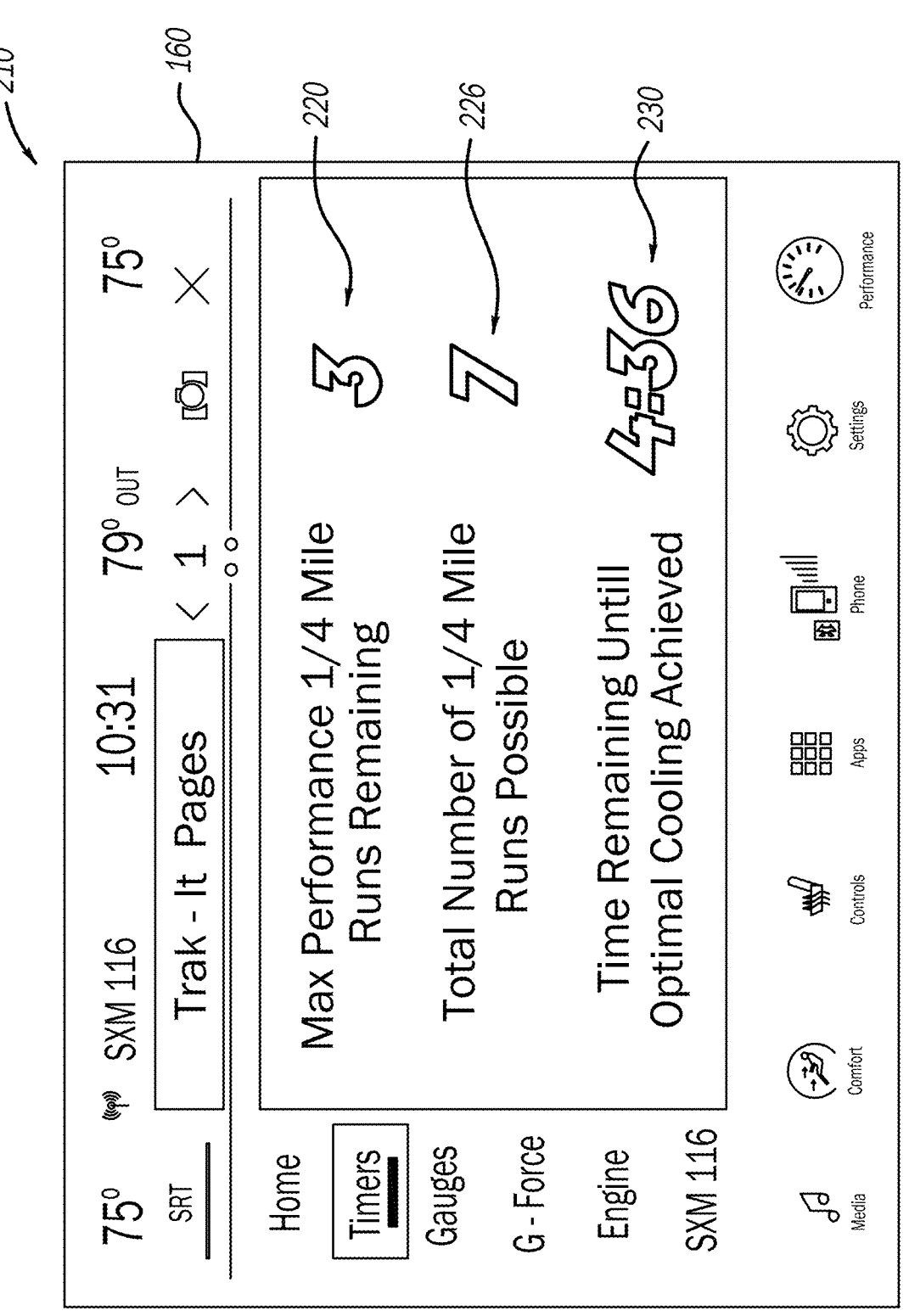
FIG. 3 is an exemplary human machine interface (HMI) that displays vehicle performance expected capabilities related to the high voltage battery system of FIG. 1.

With additional reference now to FIG. 3, an exemplary HMI 160 is shown that displays vehicle performance expected capabilities, or cool down parameters 210 related to the high voltage battery pack assembly 140. In the example shown, expected track performance information including (i) an amount of runs remaining with maximum performance in a quarter mile is displayed at 220; (ii) an amount of total runs possible in a quarter mile is displayed at 226; and (iii) a time remaining to cool the high voltage battery until optimal cooling is achieved is displayed at 230.

5

Figure 4:
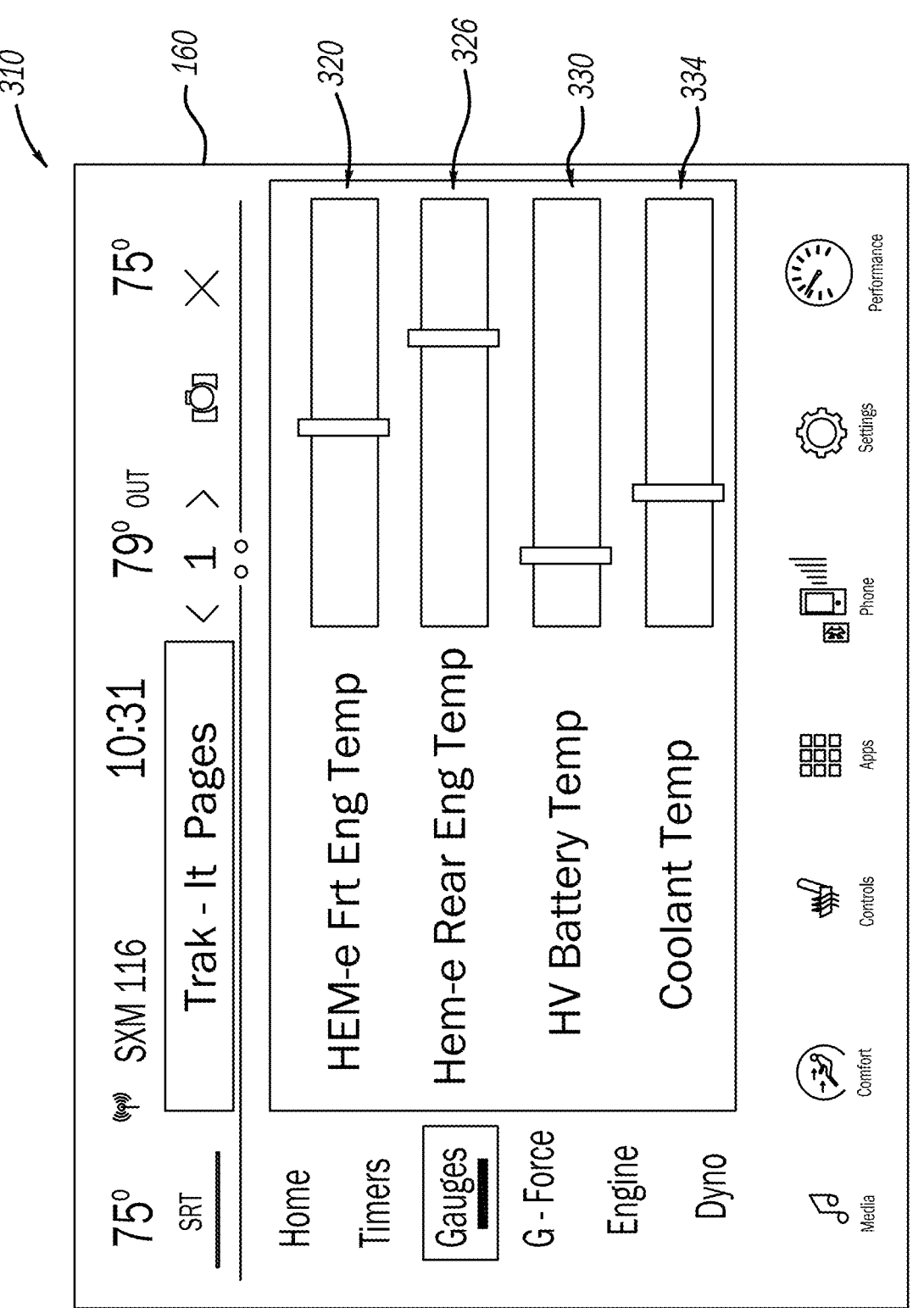
FIG. 4 is an exemplary human machine interface (HMI) that displays temperature information related to a front motor temperature, a rear motor temperature, a high voltage battery system temperature and a coolant temperature of the high voltage battery system of the electrified vehicle FIG. 1.

With additional reference now to FIG. 4, an exemplary HMI 160 is shown that displays temperature information 310 related to the electrified vehicle 100. The temperature information 310 includes, (i) a front motor temperature displayed at 320, (ii) a rear motor temperature displayed at 326, (iii) a high voltage battery system temperature displayed at 330, and (iv) a coolant temperature of the high voltage battery system displayed at 334.

In examples, the controller 142 can make calculations based on an ambient air temperature received from the ambient air sensor 156, a high voltage battery maximum temperature determined from the battery sensors 150, available power determined from the battery system 112 including the battery sensors 150, an inlet coolant temperature determined from the inlet coolant temperature sensor 152, and a current air conditioning request determined from the A/C sensor 156.

Figure 5:
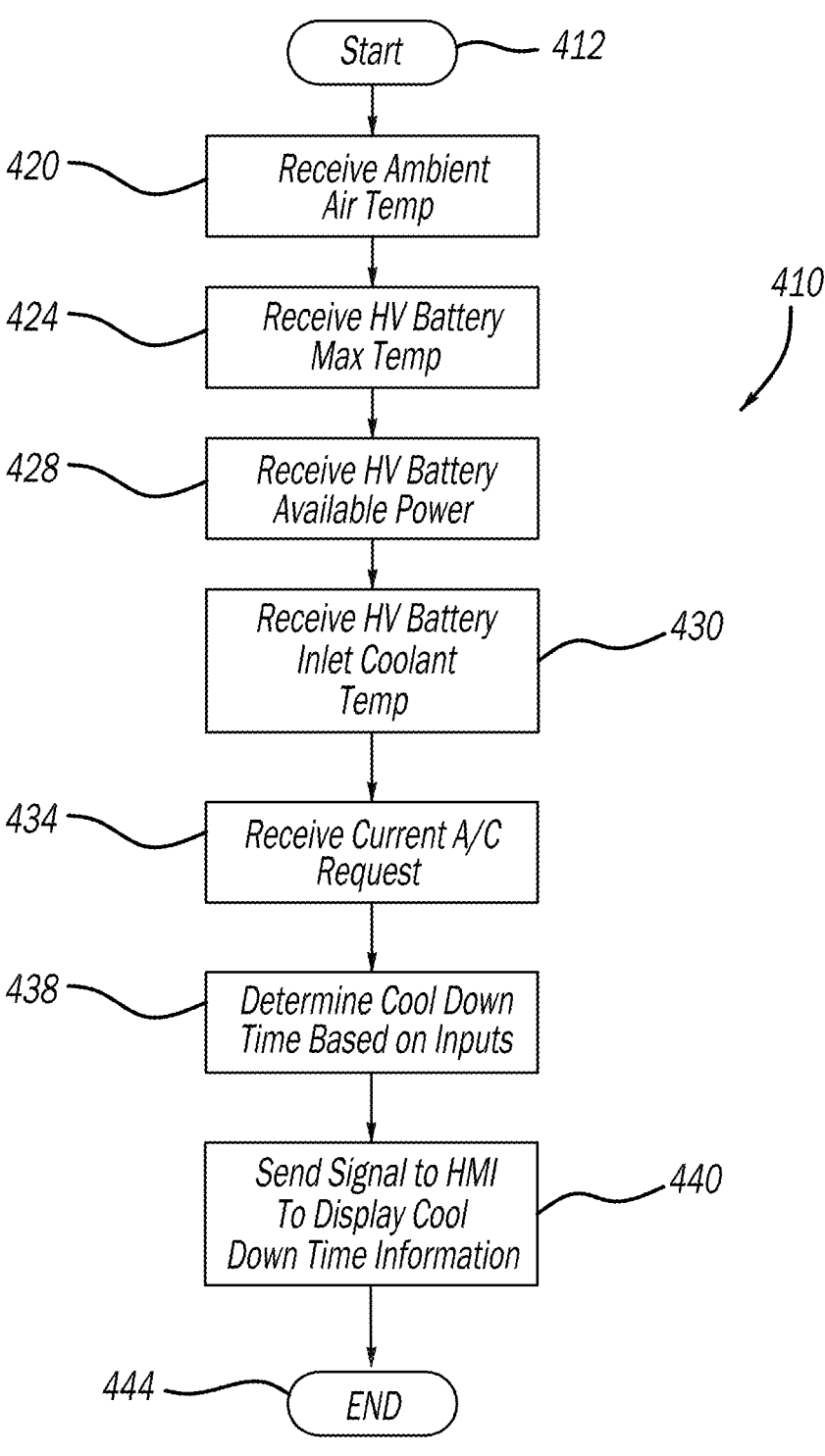
FIG. 5 is an exemplary control method that receives various vehicle operating input parameters including an ambient air temperature, a high voltage battery maximum temperature, available power, inlet coolant temperature, and a current air conditioning request, the control method determining a cool down time of the high voltage battery system based on the operating input parameters and sending a signal to a human machine interface to display the cool down time information shown in FIG. 3.

With additional reference to FIG. 5, an exemplary control method 410 that receives various vehicle operating parameters, determines cool down times based on the vehicle operating parameters and sends a signal to the HMI 160 to display cool down time information such as described above with respect to FIGS. 3 and 4 is shown. Control starts at 412. At 420, control receives an ambient air temperature. The ambient air temperature can be provided by the ambient air temperature sensor 158. At 424 control receives a high voltage battery maximum temperature. The high voltage battery maximum temperatures can be provided by the battery sensors 150. At 428 control receives a high voltage battery available power. The high voltage battery available power can be determined by the battery system 112 such as with information obtained by the battery sensors 150. At 430 control receives a high voltage battery inlet coolant temperature. The high voltage battery inlet coolant temperature can be obtained by the inlet coolant temperature sensor 152. At 434 control receives a current A/C request 434. The current A/C request can be obtained by the A/C sensor 156. At 438 control determines a cool down time based on the inputs. At 440 control sends a signal to the HMI 160 to display cool down time information such as described above with respect to FIGS. 3 and 4. Control ends at 444.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle system that communicates temperature information of a high voltage battery system of an electrified vehicle, the system comprising:

a human machine interface (HMI) provided on the electrified vehicle that graphically displays temperature information of the high voltage battery system;

sensors that sense parameters of the electrified vehicle, the sensors comprising:

at least one temperature sensor disposed on at least one battery module of the high voltage battery system, the at least one temperature sensor configured to sense a maximum temperature of the at least one battery module; and a coolant temperature sensor that senses an inlet coolant temperature at the high voltage battery system; and a controller configured to:

receive the sensed parameters;

determine cool down parameters indicative of a time required to return the high voltage battery system from an elevated temperature to a reduced temperature suitable to achieve peak performance;

send a signal to the HMI that displays the cool down parameters; and wherein the HMI graphically displays the cool down parameters including at least one of:

an amount of runs remaining within maximum performance in a quarter mile; and an amount of total runs possible in a quarter mile.

2. The vehicle system of claim 1, wherein the sensors further comprise:

an air conditioning (A/C) sensor that senses an A/C status, and wherein the cool down parameters are further based on the A/C status.

3. The vehicle system of claim 1, wherein the sensors further comprise:

an ambient air temperature sensor that senses an ambient air temperature, and wherein the cool down parameters are further based on the ambient air temperature.

4. The vehicle system of claim 1, wherein the cool down parameters comprise both of:

an amount of runs remaining within maximum performance in a quarter mile; and an amount of total runs possible in a quarter mile.

5. The vehicle system of claim 1, wherein the cool down parameters further comprise:

a time remaining to cool the high voltage battery system until optimal cooling is achieved.

6. The vehicle system of claim 1, wherein the controller is further configured to:

send a signal to the HMI that displays temperature information related to the electrified vehicle.

7. The vehicle system of claim 6, wherein the temperature information comprises at least one of:

a front motor temperature;

a rear motor temperature;

a high voltage battery system temperature; and a coolant temperature of the high voltage battery system.

8. A method for communicating temperature information of a high voltage battery system of an electrified vehicle, the method comprising:

receiving, at a controller, sensed parameters including a maximum temperature of the high voltage battery system and a coolant temperature at the high voltage battery system;

determining, at the controller, cool down parameters indicative of a time required to return the high voltage battery system from an elevated temperature to a reduced temperature suitable to achieve peak performance;

sending, from the controller, a signal to a human machine interface indicative of the cool down parameters; and graphically displaying, at the HMI, the cool down parameters including at least one of:

an amount of runs remaining within maximum performance in a quarter mile; and an amount of total runs possible in a quarter mile.

9. The method of claim 8, further comprising:

receiving an air conditioning (A/C) status, and wherein the cool down parameters are further determined based on the A/C status.

10. The method of claim 8, further comprising:

receiving an ambient air temperature, and wherein the cool down parameters are further determined based on the ambient air temperature.

11. The method of claim 8, wherein displaying the cool down parameters comprises both of:

displaying an amount of runs remaining within maximum performance in a quarter mile; and displaying an amount of total runs possible in a quarter mile.

12. The method of claim 8, wherein displaying the cool down parameters further comprises:

displaying a time remaining to cool the high voltage battery system until optimal cooling is achieved.

13. The method of claim 8, further comprising:

sending a signal to the HMI that displays temperature information related to the electrified vehicle.

14. The method of claim 13 wherein the temperature information comprises at least one of:

a front motor temperature;

a rear motor temperature;

a high voltage battery system temperature; and a coolant temperature of the high voltage battery system.

* * * * *